(12) United States Patent
Cheng

(10) Patent No.: US 7,675,565 B2
(45) Date of Patent: Mar. 9, 2010

(54) DIGITAL CAMERA MODULE WITH LENS MOVEABLE VIA RADIALLY MAGNETIZED MAGNETS

(75) Inventor: Hsu-Ting Cheng, Taipei (TW)

(73) Assignee: Lite-On Technology Corp., Taipei (TW)

( * ) Notice: Subject to any disclaimer, the term of this patent is extended or adjusted under 35 U.S.C. 154(b) by 551 days.

(21) Appl. No.: 11/608,768

(22) Filed: Dec. 8, 2006

(65) Prior Publication Data

US 2007/0159550 A1    Jul. 12, 2007

(30) Foreign Application Priority Data

Jan. 12, 2006    (TW) ............................... 95101280 A

(51) Int. Cl.
*H04N 5/232* (2006.01)
*G03B 13/14* (2006.01)
*H04N 5/225* (2006.01)
*G03B 3/10* (2006.01)
*G02B 7/02* (2006.01)

(52) U.S. Cl. ........................ 348/357; 348/374; 396/133; 359/824

(58) Field of Classification Search ............ 348/208.11, 348/208.7, 335, 345, 357, 373, 374, 376; 396/133, 144; 359/199.4, 200.8, 814, 824
See application file for complete search history.

(56) References Cited

U.S. PATENT DOCUMENTS

| | | | | |
|---|---|---|---|---|
| 4,905,031 | A * | 2/1990 | Mody | ........................ 396/133 |
| 5,499,143 | A * | 3/1996 | Sakamoto et al. | ........... 359/824 |
| 6,856,469 | B2 * | 2/2005 | Yoneyama et al. | .......... 359/696 |
| 7,298,562 | B2 * | 11/2007 | Sue et al. | ..................... 359/819 |
| 7,394,603 | B2 * | 7/2008 | Shiraki et al. | ................ 359/819 |
| 7,444,073 | B2 * | 10/2008 | Lee | ............................... 396/72 |
| 7,480,004 | B2 * | 1/2009 | Lee et al. | ..................... 348/357 |
| 2006/0034599 | A1 * | 2/2006 | Osaka | ......................... 396/144 |
| 2006/0245747 | A1 * | 11/2006 | Tiao et al. | ..................... 396/85 |
| 2006/0280492 | A1 * | 12/2006 | Chang et al. | ................ 396/133 |
| 2007/0108847 | A1 * | 5/2007 | Chang | .......................... 310/12 |
| 2007/0110424 | A1 * | 5/2007 | Iijima et al. | ................. 396/133 |
| 2007/0166022 | A1 * | 7/2007 | Lai | .............................. 396/133 |
| 2007/0216799 | A1 * | 9/2007 | Honma | ....................... 348/374 |
| 2007/0247539 | A1 * | 10/2007 | Ho et al. | ..................... 348/335 |
| 2008/0063390 | A1 * | 3/2008 | Hsiao et al. | .................. 396/133 |
| 2008/0095524 | A1 * | 4/2008 | Hsiao et al. | ................. 396/133 |
| 2008/0118239 | A1 * | 5/2008 | Hsiao et al. | ................. 396/133 |
| 2008/0118240 | A1 * | 5/2008 | Hong et al. | ................. 396/133 |
| 2008/0158412 | A1 * | 7/2008 | Tagome et al. | ............. 348/374 |
| 2008/0159729 | A1 * | 7/2008 | Hong et al. | ................. 396/133 |
| 2008/0175578 | A1 * | 7/2008 | Wu et al. | ..................... 396/144 |
| 2008/0198254 | A1 * | 8/2008 | Nagasaki | ..................... 348/335 |
| 2008/0204590 | A1 * | 8/2008 | Toya et al. | .................. 348/373 |
| 2008/0259468 | A1 * | 10/2008 | Chung | ........................ 359/814 |
| 2008/0297642 | A1 * | 12/2008 | Osaka | ......................... 348/335 |

FOREIGN PATENT DOCUMENTS

| | | | |
|---|---|---|---|
| CN | 1514296 A | | 7/2004 |
| JP | 03088136 A | * | 4/1991 |
| JP | 2005-128405 | | 5/2005 |
| TW | 551765 | | 9/2003 |

\* cited by examiner

*Primary Examiner*—John M Villecco

(57) ABSTRACT

A digital camera module includes a lens assembly, a magnetic field generator, a shell and radially magnetized magnets. The magnetic field generator has a moving direction and surrounds the lens assembly. The shell covers the lens assembly. The radially magnetized magnets are disposed separately in the moving direction and at two sides of the magnetic field generator.

11 Claims, 4 Drawing Sheets

DIGITAL CAMERA MODULE WITH LENS MOVEABLE VIA RADIALLY MAGNETIZED MAGNETS

FIELD OF THE INVENTION

The present invention relates to a digital camera module, and more particularly to a small-sized digital camera module which can be integrated with a portable electronic device.

BACKGROUND OF THE INVENTION

The portable electronic device integrated with a digital camera is very popular at present, e.g. the cellphone with a photographing function. The portable electronic device features a small size, so it is important to manufacture the digital camera with a smaller size to be integrated with the portable electronic device. Besides, since most portable electronic devices are powered by batteries, whether the digital cameras integrated therewith are power-saving is also important.

For the digital camera, since the lens position thereof needs to be adjusted to obtain a proper focus, usually a focus adjusting module is equipped therewith. In the prior art, a DC or stepping motor is used with a transmission mechanism to adjust the position of the lens or photoactive element for focusing. However, the transmission mechanism complicates the assembly of the digital camera. Moreover, the mechanical noise will be generated since the transmission mechanism is driven by the motor.

For overcoming the above drawbacks, the magnetic force is currently used for focusing. A digital camera focusing mechanism is disclosed in Taiwan Patent No. 551,765, which changes the position of the photoactive element by the magnetic element, coil and elastic element for focusing. A current is provided in the coil to generate a magnetic field repelling the magnetic element, so that the photoactive element connected with the magnetic element moves due to the magnetic force. The elastic element enables the photoactive element to move continuously for achieving the continuous focusing. The displacement of the photoactive element is controlled by controlling the current provided in the coil.

A digital camera adjusting structure is disclosed in Japan Patent No. 2005-128405. A cylindrical structure is used to cover the lens module, and a yoke, magnet and coil are disposed on the cylindrical structure to surround the lens module. The lens module moves by means of the magnetic force generated by the magnet and coil for focusing.

Please refer to FIG. 1, which is an exploded view of the digital camera module in the prior art. A coil 111 is wrapped around a lens module 222. The coil 111 and the lens module 222 are placed in a holder 333, and a plurality of magnets 4 are disposed around the holder 333. The lens module 222 moves by means of the interaction between the magnetic force generated by the magnets 4 and that generated by the coil 111 after being electrified, thereby changing the position of the lens module 222 and thus the distance between the lens module 222 and the photoactive element for focusing.

Currently, the magnet or magnetic element must be disposed outside of the lens, which will increase the volume of the digital camera. Furthermore, since the current magnet or magnetic element is disposed around the coil, the direction of the magnetic line generated by the magnet or magnetic element is not perpendicular to that generated by the coil. Therefore, a larger current is required for the coil to generate a larger magnetic field for moving the lens or photoactive element. This will consume more electric power, which is unfavorable for the portable electronic device.

In order to overcome the drawbacks in the prior art, an improved digital camera module is provided. The particular design in the present invention not only solves the problems described above, but also is easy to be implemented. Thus, the present invention has the utility for the industry.

SUMMARY OF THE INVENTION

A digital camera module is provided in the present invention, which includes a lens assembly, a magnetic force generator, a shell and a plurality of radially magnetized magnets. The magnets are disposed separately at the upper and lower sides of the lens assembly, which can save the space around the lens assembly, thereby reducing the volume of the digital camera module. Since the magnets are disposed separately at the upper and lower sides of the lens assembly and are radially magnetized ones, the direction of the magnetic line generated by the magnets is perpendicular to that generated by the coil, so that the movement of the lens assembly is more efficient. The friction of the system is overcome by means of the magnetic field generated by a smaller current provided by the coil, and thus the focusing is achieved.

It is an aspect of the present invention to provide a digital camera module, which includes a lens assembly, a magnetic field generator, a shell and a plurality of radio magnetized magnets. The lens assembly is covered by the shell, and the magnetic field generator surrounds the lens assembly. Besides, the radio magnetized magnets are disposed separately at two sides of the magnetic field generator.

Further, the digital camera also includes a yoke disposed outside of the lens assembly for adjusting the size tolerance of the radial magnetized magnets.

In addition, the magnetic field generator is a coil which generates a magnetic field by introducing a current flowing therethrough. The direction of the magnetic line generated by the coil is perpendicular to the direction of the magnetic lines of the radial magnetized magnets. Meanwhile, the magnetic force generated by the coil interacts with the magnetic force generated by the radial magnetized magnets to move the lens assembly to focus.

The digital camera module of the present invention also includes some elements employed in the conventional one, e.g. an image sensor. Besides, the digital camera module of the present invention also includes a position adjusting element disposed in the shell for controlling the position of the lens assembly. The position adjusting element can be an elastomer. Preferably, the elastomer is one selected from the group consisting of an elastic plate, a spring and the combination thereof.

It is another aspect of the present invention to provide a portable electronic device which includes the digital camera of the present invention. Since the digital camera module of the present invention has a small volume and is power-saving, it is quite suitable to be integrated with all kinds of portable electronic devices. The portable electronic device integrated with a digital camera has already been very popular in the market, e.g. the cellphone with a photographing function, the laptop computer with a digital camera, etc. The portable electronic device of the present invention features a small-sized and power-saving digital camera module integrated therewith, due to the position change of the magnet and the use of the radial magnetized magnet. As for the other technical features of the portable electronic device, they are all the same as the conventional portable electronic device. Preferably, the portable electronic device can be a mobile phone, a laptop computer, a personal digital assistance (PDA) or a mobile music player.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
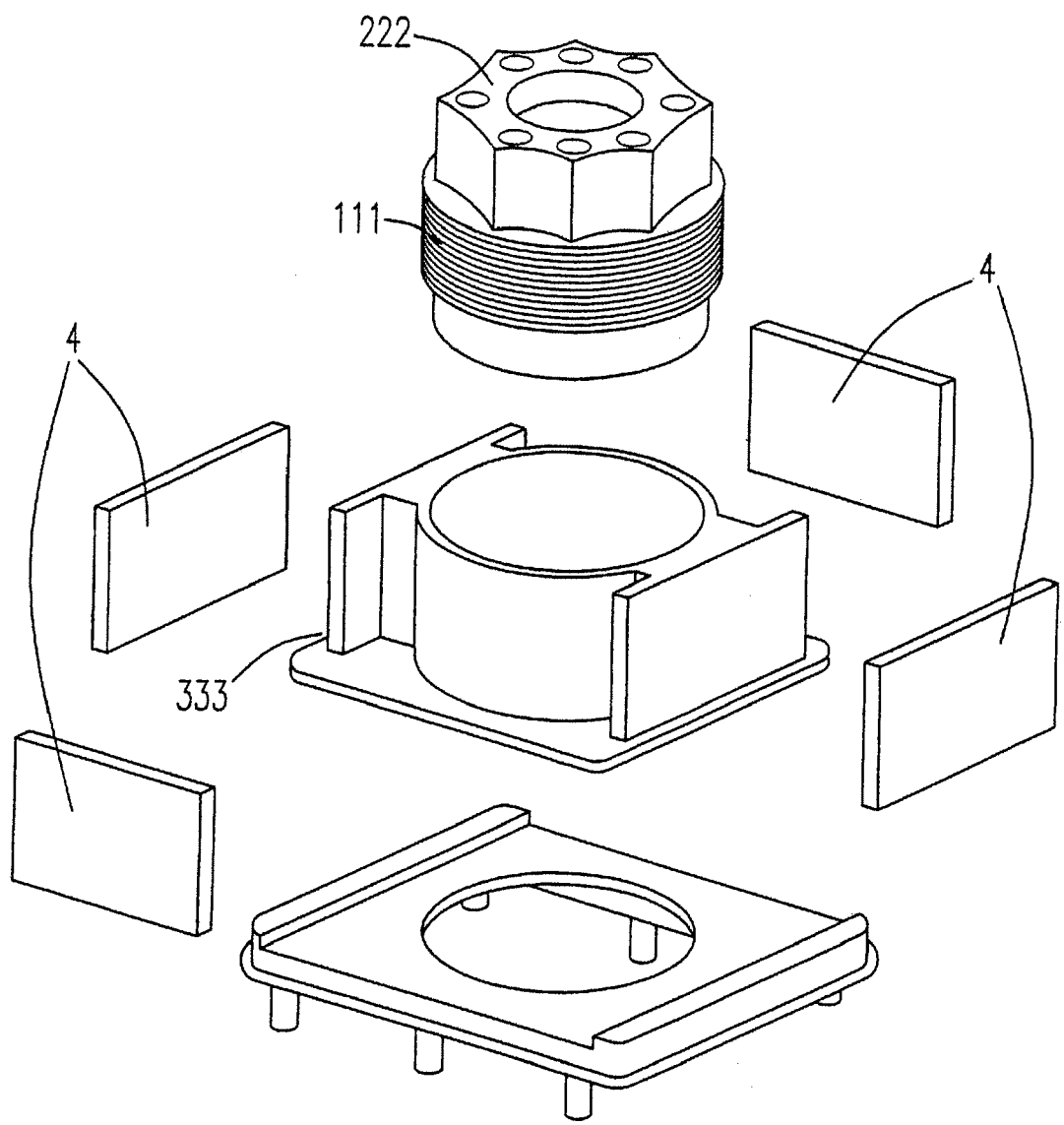
FIG. 1 is an exploded view of the digital camera module in the prior art.
Figure 2:
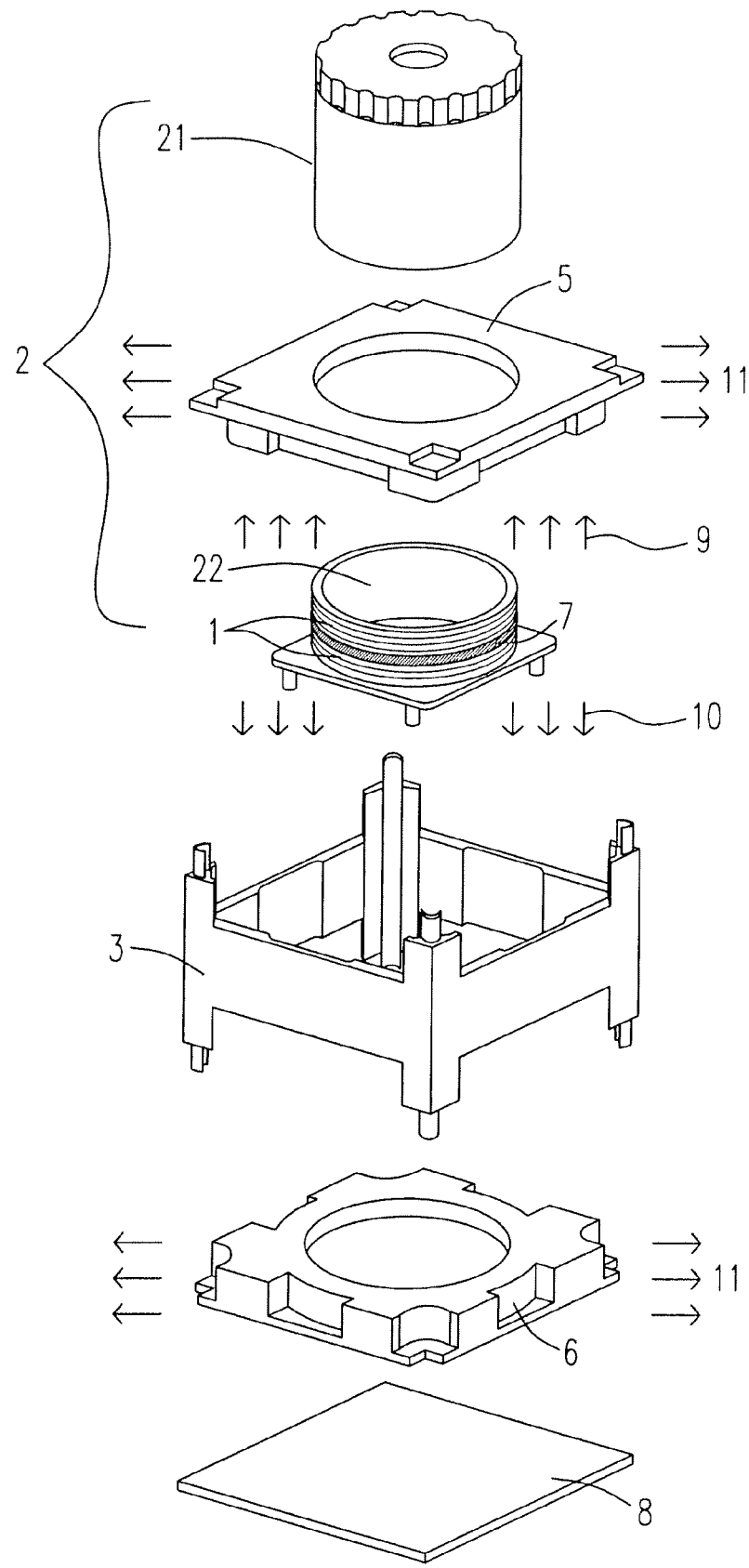
FIG. 2 is an exploded view of the digital camera module according to a first preferred embodiment of the present invention.

Please refer to FIG. 2, which is an exploded view of the digital camera module according to a first preferred embodiment of the present invention. The digital camera module includes a coil 1, a lens assembly 2, a lens 21, a lens covering element 22, a holder 3, an upper radial magnetized magnet 5, a lower radial magnetized magnet 6, a yoke 7 and a photoactive element 8. The lens assembly 2 composed of the lens 21 and the lens covering element 22 is placed in the holder 3. The yoke 7 is disposed on the lens covering element 22 to divide it into two parts, each of which is wrapped with the coil 1 for generating a magnetic field by introducing a current flowing therethrough. A magnetic field of magnetic lines 9 in a first direction and a magnetic field of magnetic lines 10 in a second direction are respectively generated according to the direction of the current flowing through the coil 1. When the current flows anti-clockwise around the holder 3, the magnetic field of magnetic lines 9 is generated. Whereas, when the current flows clockwise around the holder 3, the magnetic field of magnetic lines 10 is generated.

Since the magnetic line is emitted from the magnetic north pole to the magnetic south pole, if the current flows anti-clockwise around the lens covering element 22 to generate the magnetic field of magnetic lines 9, the lens assembly 2 will be pushed away from the lower radial magnetized magnet 6 to be close to the upper radial magnetized magnet 5 due to the interaction between radial magnetized magnetic lines 11 and magnetic lines 9. In this case, the position of the lens assembly 2 is away from the photoactive element 8. According to the photography principle, the longer distance between the lens and the photoactive element is, the closer object the lens will be focused on. Therefore, when the digital camera module needs to be operated within a short distance, the current flows anti-clockwise around the lens covering element 22 for focusing. Whereas, when the object to be focused on is located in the distance, the current flows clockwise around the lens covering element 22 to generate the magnetic field of magnetic lines 10 for focusing.

The yoke 7 is used to adjust the respective size tolerances of the upper radial magnetized magnet 5 and the lower radial magnetized magnet 6 for providing a sufficient focus range.

Figure 3:
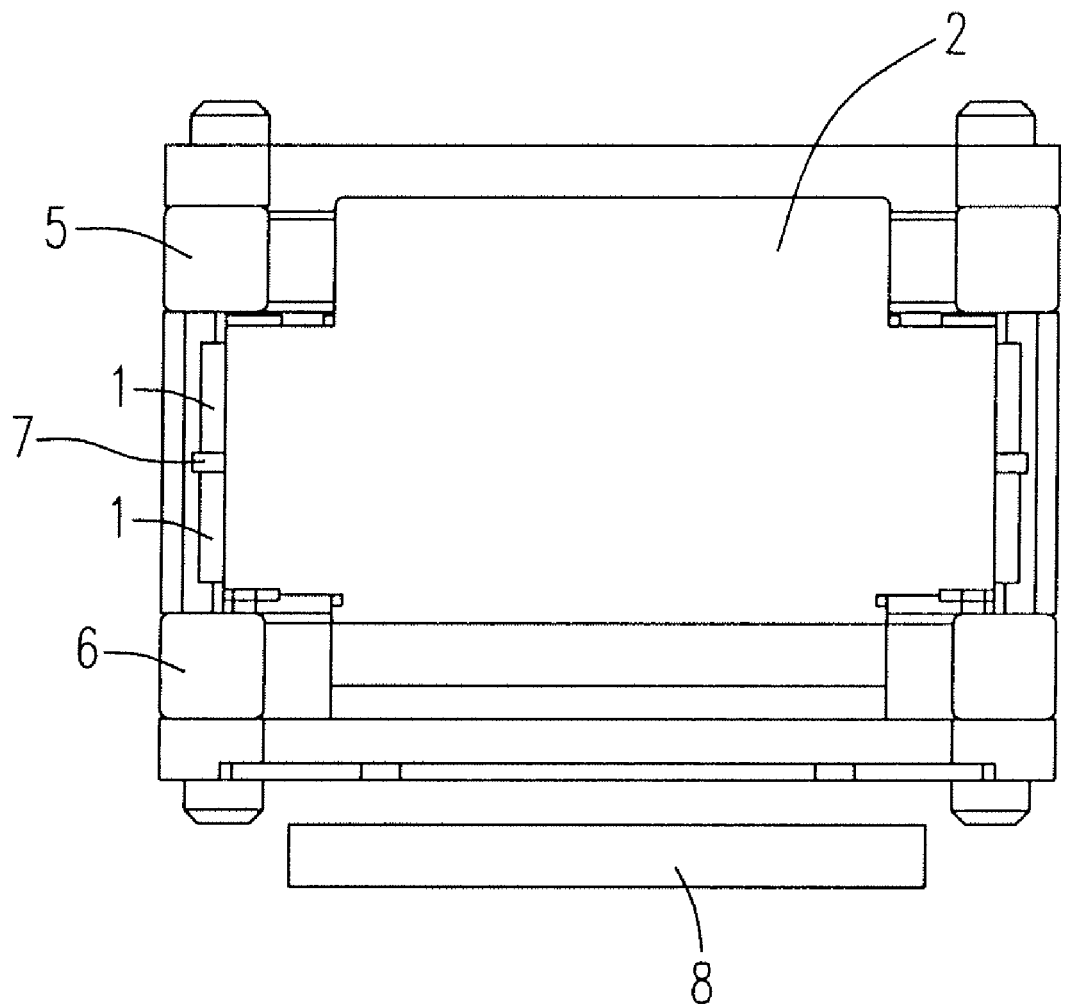
FIG. 3 is a side view of the digital camera module according to a first preferred embodiment of the present invention.

Please refer to FIG. 3, which is a side view of the digital camera module according to a first preferred embodiment of the present invention. Since the lens assembly 2 will not be blocked by any obstacle while moving, only two focuses, a maximum focus and a minimum one, exist in the embodiment of FIG. 3.

Figure 4:
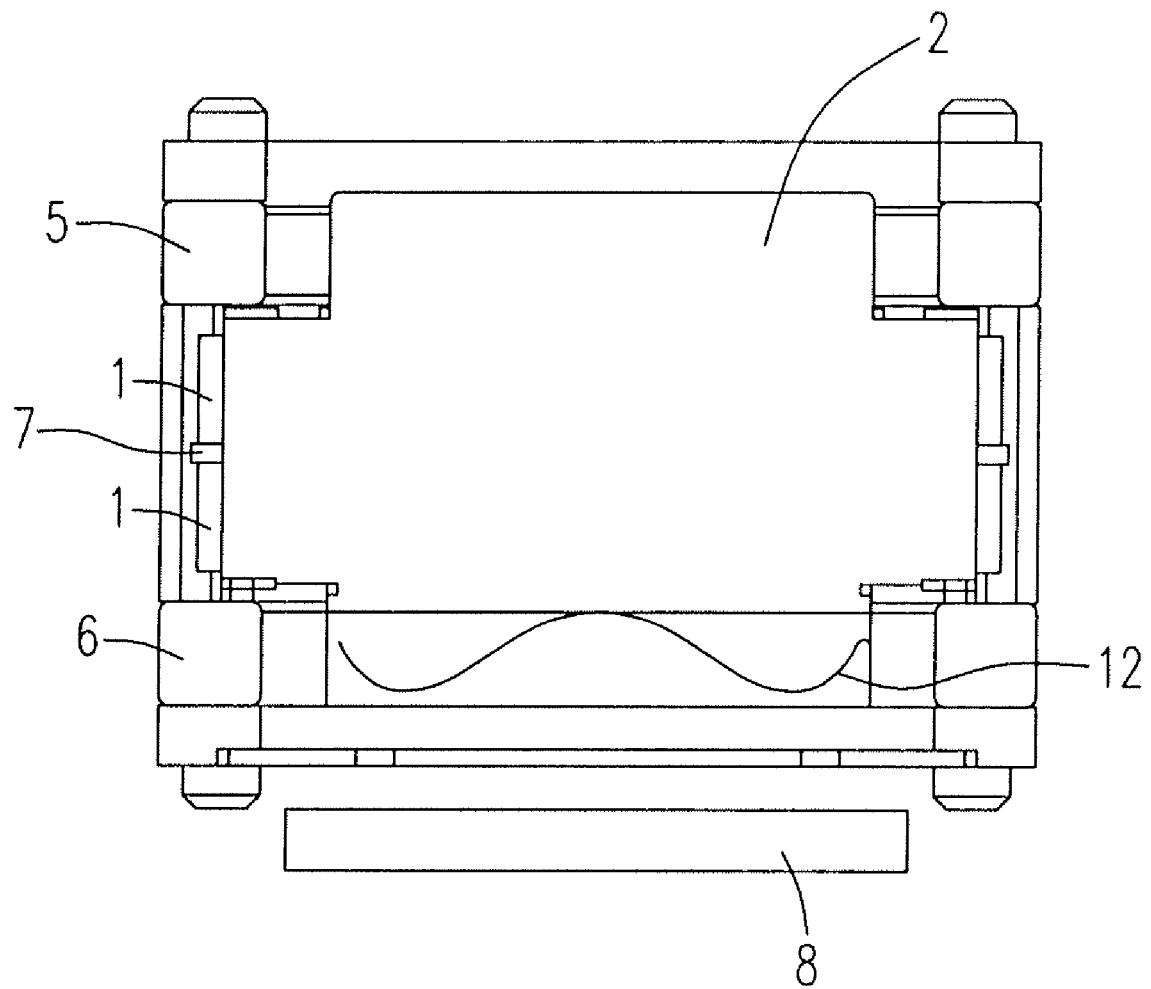
FIG. 4 is a side view of the digital camera module according to a second preferred embodiment of the present invention.

Please refer to FIG. 4, which is a side view of the digital camera module according to a second preferred embodiment of the present invention. In the embodiment of FIG. 4, an elastic plate is disposed between the lens assembly 2 and the photoactive element 8. In this case, when the lens assembly 2 moves toward the photoactive element 8, it can be stopped in an arbitrary position if the magnitude of the current is adjusted to achieve the balance between the driving force and the elasticity provided by the elastic plate 12. Hence, the distance between the lens assembly 2 and the photoactive element 8 can be controlled according to actual needs, thereby achieving a multi-stage continuous focusing.

Further, the digital camera module of the present invention can be integrated with a cellphone. The digital camera module can be built in the cellphone by the existing technology. Also, the digital camera module can be externally connected to the cellphone, for example engaged with or plugged into the cellphone, to form a cellphone with a photographing function.

Besides a cellphone, the digital camera module of the present invention can also be integrated with any kind of portable electronic device by the existing technology. Preferably, the portable electronic device can be a laptop computer, a personal digital assistance, a mobile music player, etc.

In conclusion, the present invention provides a digital camera module which includes a lens assembly, a magnetic force generator, a shell and a plurality of radially magnetized magnets. The magnets are disposed separately at the upper and lower sides of the lens assembly, which can save the space around the lens assembly, thereby reducing the volume of the digital camera module. Since the magnets are disposed separately at the upper and lower sides of the lens assembly and the radially magnetized ones, the direction of the magnetic line generated by the magnets is perpendicular to that generated by the coil, so that the movement of the lens assembly is more efficient. The friction of the system is overcome by means of the magnetic field generated by a smaller current provided by the coil, and thus the focusing is achieved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A digital camera module, comprising:
    a lens assembly;
    a magnetic field generator having a moving direction and surrounding the lens assembly;
    a shell covering the lens assembly; and
    a plurality of radially magnetized magnets disposed one on top of the other in the moving direction and separately at two sides of the magnetic field generator.

2. The digital camera module as claimed in claim 1, further comprising an image sensor.

3. The digital camera module as claimed in claim 1, wherein the magnetic field generator is a coil.

4. The digital camera module as claimed in claim 3, wherein the coil generates a magnetic field by introducing a current flowing therethrough.

5. The digital camera module as claimed in claim 4, wherein a direction of a magnetic line generated by the coil is perpendicular to a direction of magnetic lines of the plurality of radial magnetized magnets.

6. The digital camera module as claimed in claim 4, wherein a magnetic force generated by the coil interacts with a magnetic force generated by the plurality of radial magnetized magnets to move the lens assembly to focus.

7. The digital camera module as claimed in claim 1, further comprising a position adjusting element disposed in the shell for controlling a position of the lens assembly.

8. The digital camera module as claimed in claim 7, wherein the position adjusting element is an elastomer.

9. The digital camera module as claimed in claim 8, wherein the elastomer is one selected from a group consisting of an elastic plate, a spring and a combination thereof.

10. A portable electronic device comprising a digital camera module, wherein the digital camera has a lens assembly, a magnetic field generator having a moving direction and surrounding the lens assembly, a shell covering the lens assembly, and a plurality of radially magnetized magnets disposed one on top of the other in the moving direction and separately at two sides of the magnetic field generator.

11. The portable electronic device as claimed in claim 10, being one selected from a group consisting of a mobile phone, a laptop computer, a personal digital assistant and a mobile music player.

* * * * *